US012752701B2

(12) United States Patent
Knipp et al.

(10) Patent No.: US 12,752,701 B2
(45) Date of Patent: Oct. 6, 2026

(54) METHOD AND DEVICE FOR CONTROLLING THE INTERIOR LIGHTING OF A VEHICLE

(71) Applicant: Volkswagen Aktiengesellschaft, Wolfsburg (DE)

(72) Inventors: Richard Knipp, Berlin (DE); André Heinrichs, Gifhorn (DE); Janine Bretz, Bokensdorf (DE); Margret Siegmund, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 525 days.

(21) Appl. No.: 17/770,970

(22) PCT Filed: Oct. 13, 2020

(86) PCT No.: PCT/EP2020/078791
§ 371 (c)(1),
(2) Date: Apr. 21, 2022

(87) PCT Pub. No.: WO2021/078590
PCT Pub. Date: Apr. 29, 2021

(65) Prior Publication Data

US 2022/0402430 A1 Dec. 22, 2022

(30) Foreign Application Priority Data

Oct. 24, 2019 (DE) ......................... 102019216415.3

(51) Int. Cl.
*B60Q 3/85* (2017.01)
*H05B 45/20* (2020.01)
*H05B 47/155* (2020.01)

(52) U.S. Cl.
CPC ............... *B60Q 3/85* (2017.02); *H05B 45/20* (2020.01); *H05B 47/155* (2020.01); *B60Q 2500/30* (2022.05); *B60Q 2900/50* (2022.05)

(58) Field of Classification Search
None
See application file for complete search history.

(56) References Cited

U.S. PATENT DOCUMENTS 9,679,532 B2 * 6/2017 Dorner ............... G06Q 30/0627
10,703,265 B2 * 7/2020 Fuhrmann ............. B60K 35/10
(Continued)

FOREIGN PATENT DOCUMENTS

CN 107226021 A 10/2017
CN 110234539 A 9/2019
(Continued)

OTHER PUBLICATIONS www.canva.com/colors/color-wheel accessed via archive.com wayback machine log date Mar. 30, 2019 (Year: 2019).*
(Continued)

*Primary Examiner* — Abdhesh K Jha
*Assistant Examiner* — David Hatch
(74) *Attorney, Agent, or Firm* — Peter Zura; LOZA & LOZA, LLP

(57) ABSTRACT

Technologies and techniques for controlling the interior lighting of a vehicle. Multiple lighting units are distributed in the interior of the vehicle, and each of the lighting units is assigned at least two color zones. Arrangement profiles for arranging the at least two color zones in the interior of the vehicle are displayed on a display and operating device, and a user selection of one of the arrangement profiles is detected. A color selection by the user is detected for each of the at least two color zones via a respective operating element displayed on the display and operating device, and
(Continued)

a color is set for each lighting unit by a controller according to the selected arrangement profile and the colors selected for the at least two color zones. The invention also relates to a device for controlling the interior lighting of a vehicle.

20 Claims, 2 Drawing Sheets

(56) References Cited

U.S. PATENT DOCUMENTS

| | | | | |
|---|---|---|---|---|
| 10,800,327 | B1 * | 10/2020 | Claywell | B60Q 3/80 |
| 2012/0025738 | A1 | 2/2012 | Beiner | |
| 2019/0031187 | A1 * | 1/2019 | Noguerol | B60W 40/08 |

FOREIGN PATENT DOCUMENTS

| | | | |
|---|---|---|---|
| DE | 102006030300 | A1 | 1/2008 |
| DE | 102006030300 | B4 | 2/2012 |
| DE | 102012010044 | A1 | 11/2013 |
| DE | 102012024042 | A1 | 3/2014 |
| DE | 102013009063 | A1 | 12/2014 |
| DE | 102014215329 | A1 | 2/2016 |
| DE | 102015011891 | A1 | 1/2017 |
| DE | 102016005255 | A1 | 11/2017 |
| DE | 102017005126 | A1 | 12/2018 |
| DE | 102017213987 | A1 | 2/2019 |
| EP | 2905174 | A1 | 8/2015 |
| EP | 2982541 | A2 | 2/2016 |

OTHER PUBLICATIONS

Corresponding CN Application No. 202080071852.3. Office Action dated Jun. 8, 2023.

PCT/EP2020/078791. International Search Report (Jan. 22, 2021).

* cited by examiner

METHOD AND DEVICE FOR CONTROLLING THE INTERIOR LIGHTING OF A VEHICLE

RELATED APPLICATIONS

The present application claims priority to International Patent App. No. PCT/EP2020/078791 to Knipp, et al., titled "Method and Device for Controlling the Interior Lighting of a Vehicle", filed Oct. 13, 2020, which claims priority to German Patent App. No. 10 2019 216 415.3, filed on Oct. 24, 2019, the contents of each being incorporated by reference in their entirety herein.

TECHNICAL FIELD

The present disclosure relates to technologies and techniques for controlling interior lighting for a vehicle.

BACKGROUND

The interior lighting of a vehicle fulfills various functions. On the one hand, lights can be provided that illuminate the interior. For example, reading lights can be provided in the vehicle roof. Furthermore, lights can be provided to illuminate the footwell, the glove compartment or the trunk. On the other hand, instrument lighting is provided which illuminates various operating elements in the interior of the vehicle, particularly at night, so that a vehicle occupant can quickly find the corresponding operating element even in the dark. Finally, lighting is provided for a display device for the driver, which is often also referred to as an instrument cluster.

In addition to the lights in the vehicle interior and the instrument lighting, further lighting devices, in particular in the form of lighting units, can be provided in the interior of the vehicle, which are intended to convey a certain ambience, i.e. a certain atmosphere. In addition to the light intensity, an essential parameter for creating the ambience is the color of the lighting.

DE 10 2006 030 300 B4 discloses a motor vehicle with lighting devices distributed in the interior. Certain areas of the interior can be illuminated in different colors.

SUMMARY

Aspects of the present disclosure are directed to improving a method and a device for controlling interior lighting for a vehicle.

Various features of the aspects are disclosed in the independent claims, found herein. Advantageous refinements of the present disclosure emerge from the subclaims. In some examples, a method is disclosed for controlling interior lighting for a vehicle, wherein several lighting units are distributed in the interior of the vehicle. The lighting units may be assigned to one of at least two color zones, with arrangement profiles of arrangements of the at least two color zones being displayed in the interior of the vehicle, and a user selection of one of the arrangement profiles is recorded. For each of the at least two color zones, a color selection of the user is recorded via an operating element displayed on the display and operating device, and whereby, for each lighting unit, a color is set according to the selected arrangement profile, and the selected colors for the at least two color zones via a control device.

In some examples, a device is disclosed for controlling interior lighting for a vehicle, that may include several lighting units being distributed in the interior of the vehicle. The lighting units may be assigned to one of at least two color zones. The device may include a display, an operating device, and a control device, wherein the display and operating device are configured to display arrangement profiles of arrangements of the at least two color zones in the interior of the vehicle, and to record a user selection of one of the arrangement profiles, and to record a color selection by the user for each of the at least two color zones via a displayed operating element, and wherein the control device is configured to set a color for each lighting unit in accordance with the selected arrangement profile and the colors selected for the at least two color zones.

The method and the device make it possible to select both an arrangement of the at least two color zones in the interior of the vehicle and the respective colors of the at least two color zones. This is done by displaying both arrangement profiles of arrangements of the at least two color zones and operating elements with which a color can be selected for the at least two color zones on a display and control device. Using the display and operating device, a desired arrangement profile and desired colors of the at least two color zones can then be selected by the user using an actuating element, for example a finger. The simultaneous display simplifies the selection process because the user receives improved feedback on where the color zones are in the vehicle and which colors are assigned to them. One advantage of the method and the device is that clarity with regard to a color assignment and an arrangement of the color zones, in particular with regard to an interaction or a combination of the colors, is increased during selection. In particular, an assignment of colors to the color zones is significantly simplified and feedback about the assigned colors and an arrangement of the color zones within the interior of the vehicle is improved.

Further features for the configuration of the device emerge from the description of configurations of the method. The advantages of the device are in each case the same as in the configurations of the method.

BRIEF DESCRIPTION OF THE DRAWINGS

Aspects of the present disclosure are explained in more detail below on the basis of preferred exemplary embodiments with reference to the figures. These show.

DETAILED DESCRIPTION

Figure 1:
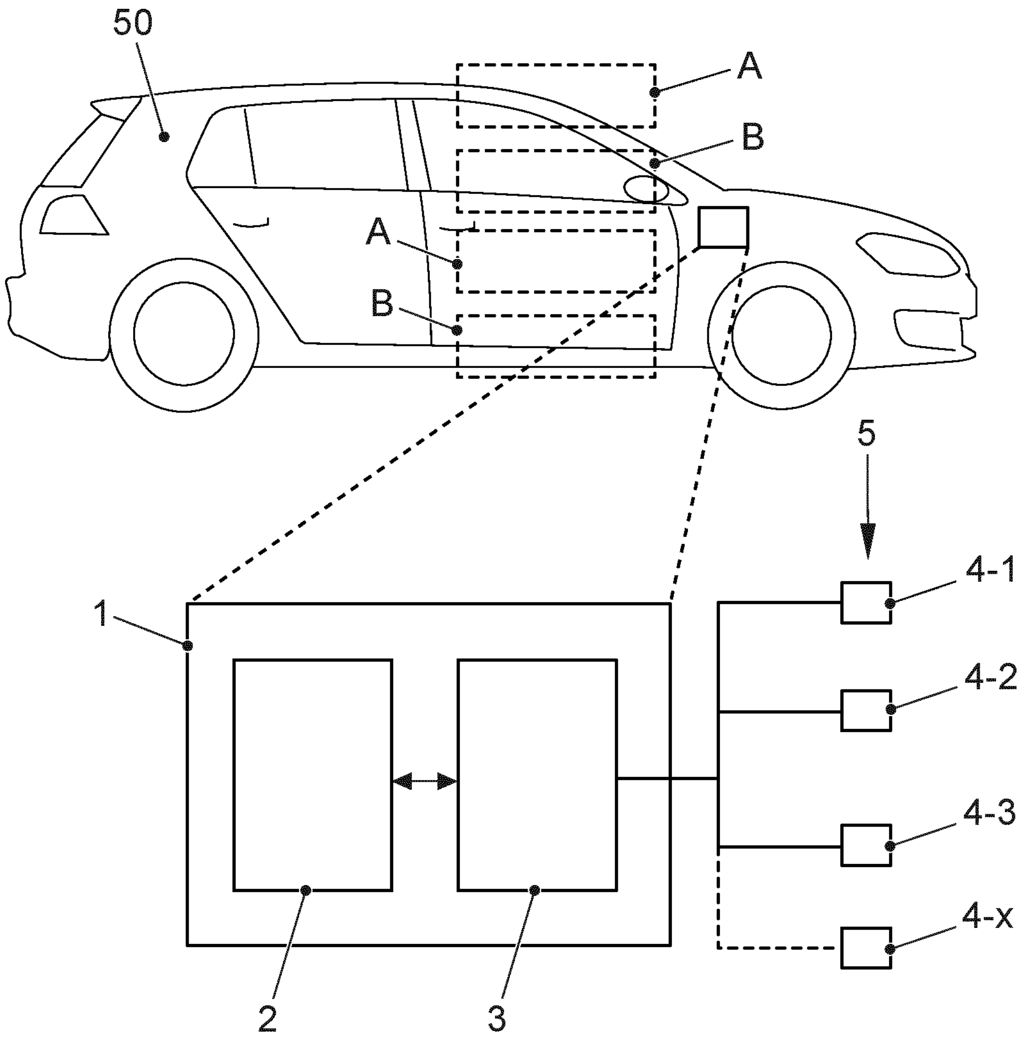
FIG. 1 shows a schematic representation of an embodiment of the device for controlling interior lighting for a vehicle according to some aspects of the present disclosure.

As used herein, an arrangement profile may define an arrangement of at least two color zones in the interior of the vehicle. There can also be several non-interrelated spatial zones within the interior that are assigned to a single color zone (e.g., the door pockets of all vehicle doors can be assigned to one color zone). For example, it can be provided that a color zone A and a color zone B are spatially distributed in the interior in the vertical sequence ABAB or BABA. It can also be provided that more than two color zones are configured. In particular, it is provided that the arrangement profiles or arrangements are each represented as a graphic representation or as a graphically configured virtual operating element on the display and operating device and can each be selected via the virtual operating element. The graphic design of the virtual operating element can simulate an interior of the vehicle in greater detail or be designed as a greatly simplified representation, for example as a horizontal sequence of layers (e.g., ABAB). For the color zones A and B used in the above example, for example, the following layer sequences can each be displayed and selected as virtual operating elements that are graphically designed, for example, as tiles with corresponding geometric areas: AB, BA, ABAB and BABA. A user can then select the desired arrangement profile by actuating the respective virtual operating element.

In some examples, one or more arrangement profiles may also be displayed on the display and operating device and can be selected via these, in which only one (single) color zone is assigned to the lighting units. Furthermore, it can be provided that an arrangement profile contains one or more color zones for which no color selection can be made, but for which a color is fixed.

In some examples, a lighting unit may be configured as a red-green-blue light-emitting diode (RGB-LED). This can represent any colors within a color space. The RGB LEDs are controlled by means of the control device to represent a corresponding color. A display and control device may include a touch-sensitive display and operating device, such as a touch screen. Operating elements can be displayed and actuated using the touchscreen. The display and operating device may be controlled via the control device, that is to say, the control device provides content to be displayed for the display and operating device and processes actuations that are recorded on or by means of the display and operating device.

An operating element is may be configured as a virtual operating element. Such a virtual operating element is not a physically designed operating element, but rather comprises a graphic representation on the display and operating device, which can be operated by means of an actuating element, for example a finger.

Parts of the device, such as the control device, can be designed individually or collectively as a combination of hardware and software, for example as program code that is executed on a microcontroller or microprocessor. However, it can also be provided that parts are designed individually or combined as an application-specific integrated circuit (ASIC).

In some examples, a graphic representation of the arrangement profiles on the display and operating device may be adapted depending on a detected color selection. In particular, it is provided that a representation of the colors within the arrangement profiles is adapted in real time when the colors for the at least two color zones are selected. As a result, a user immediately receives feedback on how a change in the selected color affects the arrangement of the color zones within the arrangement profiles. If, for example, ABAB is an arrangement profile for color zones A and B, which is illustrated as a virtual operating element by a simple graphic representation in the form of a layer sequence ABAB, and if a color of color zone A is changed, then simultaneously the one in the virtual control element for the color zone A shown on the display and operating device changes as well.

In some examples, the operating elements may be configured as sliders with which in each case a color can be set for one of the at least two color zones. It can be provided here that a color corresponding to the respective slider position is displayed along an extension direction of the slider.

In some examples, after a color has been selected for a first of the at least two color zones, a quantity of the colors that can be selected for at least one more of the at least two color zones is determined depending on the selected color. This allows a dependency to be created between the respectively selected colors. In particular, a color selection following a first color selection can hereby be limited according to its scope. This makes it possible to limit a number of possible color combinations. The amount is determined depending on the selected color, in particular by means of the control device.

It can be provided that if more than two color zones are present, a quantity of selectable colors is also determined in the same way in a color selection following a first and a second color selection. In particular, a quantity of selectable colors can be successively further restricted with each color selection that has been made.

In some examples, colors of the specified quantity may be displayed on the display and operating device for selection by the user. In this way, after a first color selection has been made, a user can be given direct feedback about which colors the user can still select within the scope of further color selections.

In some examples, selectable colors are displayed in the form of a color wheel on the display and operating device and/or that the colors of the specified quantity are displayed in the form of a color wheel on the display and operating device. This enables a particularly clear presentation and feedback to take place. In particular, it is provided that a user can select a color directly by actuating a part of a virtual operating element that corresponds to a color shown in the color wheel.

In some examples, the quantity is determined on the basis of a list stored in a memory device, the list comprising assignments of selected colors to quantities of colors. If a first color selection has been made, an associated quantity of colors is queried from the list. The colors included in the quantity are then offered for selection on the display and operating device, for example. The stored list enables determination of color combinations for the at least two color zones, for example according to aesthetic, mood-enhancing, perceptual psychological, physiological and/or individual aspects.

In some examples, the quantity may be determined on the basis of the selected color in such a way that the quantity includes colors that belong to the same color family. A color family may be defined as adjacent colors within a color wheel, which are based on primary colors (red, blue, yellow), secondary colors (green, orange, purple) and tertiary colors (mixture of a primary color with a secondary color or mixture of two secondary colors). The quantity can then, for example, be defined by a number of nearest neighbors (e.g., by including three neighbors in one direction and three neighbors in the other direction of the color wheel).

In some examples, the quantity may be determined on the basis of the selected color in such a way that the quantity comprises colors that lie in a predefined color space within a predefined distance around the selected color. For example, in an RGB color space (e.g., shown within the CIE standard color table), a distance around the selected color can be defined in the form of a distance vector or distance radius (e.g., defined via the x and y coordinates of the CIE standard color table). All colors that lie within the radius around the selected color defined by the distance vector or the distance radius are included in the quantity.

It can further be provided that the quantity may be determined on the basis of the selected color in such a way that the quantity includes colors that belong to the color family of the complementary color of the selected color.

FIG. 1 shows a schematic representation of an embodiment of the device 1 for controlling interior lighting 5 for a vehicle 50 under some aspects of the present disclosure. The device 1 comprises a touch-sensitive display and operating device 2 designed as a touchscreen and a control device 3. The device 1 in particular carries out the disclosed method for controlling the interior lighting 5 for the vehicle 50.

The interior lighting 5 is configured in such a way that a plurality of lighting units 4-*x* are arranged in a distributed manner in the interior of the vehicle 50, the lighting units 4-*x* being or being able to be assigned to one of at least two color zones A, B. For the sake of clarity, the light units 4-*x* are not shown in the vehicle 50, but rather outside of it. In this case, an assignment takes place in particular logically, that is, an assignment takes place by corresponding control of the lighting units 4-*x* by means of the control device 3. One or more assignments are stored, for example, in a memory device of the control device 2 and can be changed, for example, via a configuration menu provided for this on the display and operating device 2.

To control the interior lighting 5, the display and operating device 2 shows, for example after selecting a configuration menu provided for this purpose, arrangement profiles of arrangements of the at least two color zones A, B in the interior of the vehicle 50 and records a user selection of one of the arrangement profiles. It can be provided, for example, that a virtual operating element is represented for each arrangement profile, which shows a graphic representation of an associated arrangement of the color zones A, B. The associated arrangement profile can be selected by the user by actuating the virtual operating element.

Furthermore, the display and operating device 2 records a color selection by the user for each of the at least two color zones A, B by means of a virtual control element displayed on the display and operating device 2. The selection made in each case is fed to the control device 3.

The control device 3 sets a color for each lighting unit 4-*x* in accordance with the selected arrangement profile and the colors selected for the at least two color zones A, B, for example in that corresponding color values (e.g. RGB values for RGB LEDs) are given to control units (not shown) of the lighting units 4-*x*.

In some examples, the graphic representation of the arrangement profiles on the display and operating device 2 is adjusted depending on a recorded color selection. The adjustment may take place simultaneously, so that there is direct feedback for the user.

In some examples, the operating elements may be configured as sliders with which a color for one of the at least two color zones A, B can be set.

It can be provided that, after selecting a color for a first of the at least two color zones A, B, a quantity of the colors that can be selected for at least one further of the at least two color zones A, B is determined depending on the selected color. In particular, the control device 3 determines the amount.

In a further development, it can be provided that colors of the quantity determined are displayed on the display and operating device 2 for selection by the user. The control device 3 controls the display and operating device 2 accordingly.

In some examples, selectable colors may be represented in the form of a color wheel on the display and operating device 2 and/or that the colors of the quantity determined are displayed in the form of a color wheel on the display and operating device 2. The control device 3 controls the display and operating device 2 accordingly.

In some examples, the quantity may be determined on the basis of a list stored in a memory device of the control device 3, the list comprising assignments of selected colors to quantities of colors.

Furthermore, it can be provided that the quantity is determined on the basis of the selected color in such a way that the quantity includes colors that belong to the same color family.

In some examples, the quantity may be determined on the basis of the selected color in such a way that the quantity comprises colors that lie in a predefined color space within a predefined distance around the selected color.

Figure 2:
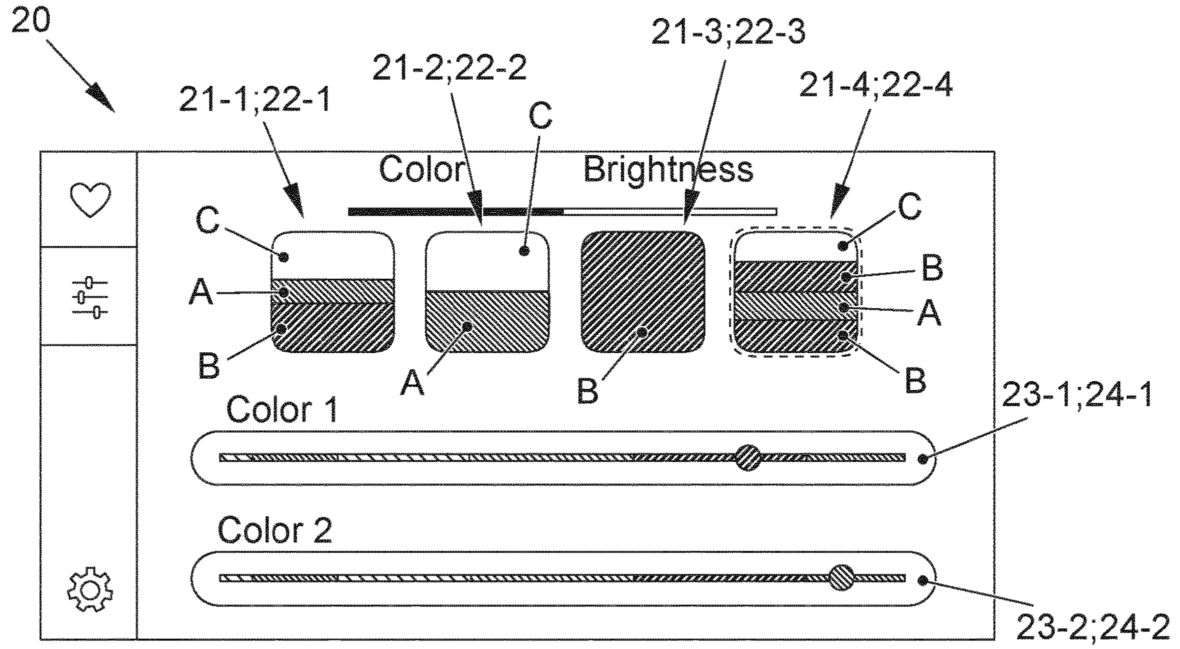
FIG. 2 shows a schematic representation of a configuration menu shown on a display and operating device for an embodiment of the method or the device according to some aspects of the present disclosure.

FIG. 2 shows a schematic representation of a configuration menu 20, which is represented on a display and operating device, for an embodiment of the method or the device under some aspects of the present disclosure. The configuration menu 20 is used to select an arrangement profile 21-*x* according to the method and the respective colors of at least two color zones A, B.

In this example, each arrangement profile 21-*x*, a virtual operating element 22-*x* is represented, which is designed as a square tile. A simplified graphic representation of an arrangement of the color zones A, B in the interior of the vehicle is shown in each virtual operating element 22-*x*. In this case, the illustration in the example shown is simplified in the form of a sequence of color zone layers running horizontally in the interior. It can be provided that one or more arrangement profiles 21-*x* are also displayed on the display and operating device and can be selected via these, in which only one (single) color zone A, B is assigned to the lighting units or for which only one color is selectable (e.g., in the arrangement profile 21-2 only the color zone A is present, for which a color can be selected, while in the arrangement profile 21-3, only the color zone B, for which a color can be selected). In addition to the two color zones A, B, for which a color can be selected, a color zone C can be provided for which no color selection can be made, but for which a color is fixed. In the example shown, this color zone C has, for example, the fixed color "white".

By actuating the virtual operating elements 22-*x*, a user can in each case select an associated arrangement profile 21-*x*. After selecting one of the arrangement profiles 21-*x*, the control device controls the lighting units in accordance with the selected arrangement profile 21-*x*.

Furthermore, two virtual operating elements 23-*x* are shown in the form of sliders-x in the configuration menu 20. These allow a selection of the colors for the two color zones A and B. Here, for each of the positions of the slider 24-*x*, a color corresponding to the respective position is displayed, so that a user immediately receives feedback via the selected or selectable color and the position required for the selection.

In some examples, a change made to the colors of the color zones A, B via the slider 24-*x* may be represented simultaneously in the virtual operating elements 22-*x* of the arrangement profiles 21-*x*, so that a user immediately receives feedback on how the change is reflected on the combination of colors in the respective arrangement of the color zones A, B.

Figure 3:
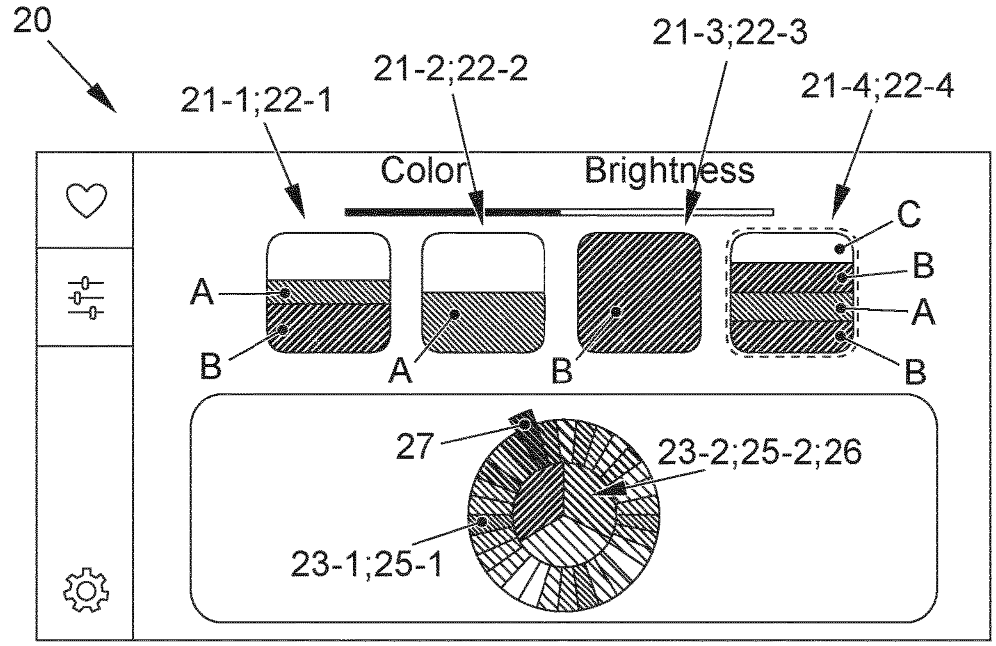
FIG. 3 shows a schematic representation of a configuration menu shown on a display and operating device for a further embodiment of the method or the device according to some aspects of the present disclosure.

FIG. 3 shows a schematic representation of a configuration menu 20, represented on a display and operating device, for a further embodiment of the method or the device. In this example, configuration menu 20 is used to select an arrangement profile 21-*x* and the respective colors of at least two color zones A, B according to the method. The configuration menu 20 in the upper area is designed identically to the configuration menu 20 shown in FIG. 2. The same reference symbols denote the same features and terms.

In contrast to the configuration menu 20 shown in FIG. 2, the configuration menu 20 in this embodiment of the method or device has no sliders, but a virtual operating element 23-1 designed as a color wheel 25-1. A user can select a color from a first of the two color zones A, B by actuating a color shown in color wheel 25.

It is provided that, after the color has been selected for the first of the two color zones A, B, a quantity 26 of the colors that can be selected for the other of the two color zones A, B is determined depending on the selected color 27. The quantity determined 26 is smaller, in particular with regard to a scope, than the quantity of colors from which a selection could be made for the first of the two color zones A, B. The quantity 26 can be represented, for example, in the form of a virtual operating element 23-2 configured as a further color wheel 25-2.

In some examples, the quantity 26 may be determined on the basis of a list stored in a memory device, the list comprising assignments of selected colors to quantities 26 of colors.

Furthermore, it can be provided that the quantity 26 is determined on the basis of the selected color in such a way that the quantity 26 includes colors that belong to the same color family. It can further be provided that the quantity 26 is determined on the basis of the selected color 27 in such a way that the quantity 26 includes colors that lie within a predefined distance around the selected color 27 in a predefined color space.

It can further be provided that the quantity 26 is determined on the basis of the selected color 27 in such a way that the quantity 26 includes colors that belong to the color family of the complementary color of the selected color 27.

LIST OF REFERENCE SYMBOLS

1 device
2 display and operating device
3 control device
4-*x* lighting unit
5 interior lighting
20 configuration menu
21-*x* arrangement profile
22-*x* virtual operating element
23-*x* virtual operating element
24-*x* slider
25-1 color wheel
25-2 another color wheel
26 quantity
27 selected color
50 vehicle
A color zone (selectable color)
B color zone (selectable color)
C color zone (fixed color)

The invention claimed is:

1. A method for controlling interior lighting for a vehicle, wherein a plurality of lighting units are distributed in the interior of the vehicle, the lighting units each having one of at least two color zones, the method comprising:

generating, via a display and operating device, a plurality of arrangement profiles for at least two color zones in the interior of the vehicle, wherein each arrangement profile defines a respective assignment of the at least two color zones to multiple predefined lighting zones in the interior of the vehicle, wherein different ones of the arrangement profiles define different respective assignments of the at least two color zones to the multiple predefined lighting zones, and wherein the arrangement profiles are displayed virtual operating elements comprising interactive graphical representations of the respective assignments;

recording a user selection of one of the arrangement profiles via the virtual operating elements;

recording a color selection for each of the at least two color zones via one or more virtual operating elements displayed on the display and operating device; and setting, via a control device, a color for each lighting unit according to the selected arrangement profile and the colors selected for the at least two color zones.

2. The method according to claim 1, further comprising adapting a graphic representation of the arrangement profiles on the display and operating device, based on a recorded color selection.

3. The method according to claim 1, wherein the virtual operating elements are configured as sliders, for setting each color of the at least two color zones.

4. The method according to claim 1, further comprising determining a quantity of the colors that can be selected for at least one more of the at least two color zones, depending on the selected color for a first of the at least two color zones.

5. The method according to claim 4, wherein colors of the specified quantity are displayed for selection by the user on the display and operating device.

6. The method according to claim 4, further comprising configuring selectable colors in the form of a color wheel on the display and operating device and/or configuring colors of the determined quantity in the form of a color circle on the display and operating device.

7. The method according to claim 4, further comprising determining the quantity on the basis of a list stored in a memory device, the list comprising assignments of selected colors to quantities of colors.

8. The method according to claim 4, wherein determining the quantity comprises determining the quantity on the basis of the selected color such that the quantity comprises colors that belong to a same color family, wherein the color family comprises colors adjacent to the selected color on a color wheel or within a predefined distance in a color space.

9. The method according to claim 4, wherein determining the quantity comprises determining the quantity on the basis of the selected color such that the quantity comprises colors that are in a predefined color space within a predefined distance around the selected color.

10. A device for controlling interior lighting for a vehicle, comprising:

a plurality of lighting units, distributed in the interior of the vehicle, the lighting units each comprising one of at least two color zones;

a display device;

an operating device, operatively coupled to the display device; and a control device, operatively coupled to the operating device, wherein the display device and operating device are configured to generate a plurality of arrangement profiles for at least two color zones in the interior of the vehicle, wherein each arrangement profile defines a respective assignment of the at least two color zones to multiple predefined lighting zones in the interior of the vehicle, wherein different ones of the arrangement profiles define different respective assignments of the at least two color zones to the multiple predefined lighting zones, and wherein the arrangement profiles are displayed virtual operating elements comprising interactive graphical representations of the respective assignments;

record a user selection of one of the arrangement profiles via the virtual operating elements;

record a color selection for each of the at least two color zones via one or more operating elements displayed on the display and operating device; and set a color for each lighting unit according to the selected arrangement profile and the colors selected for the at least two color zones.

11. The device according to claim 10, wherein the display device and operating device are configured to adapt a graphic representation of the arrangement profiles, based on a recorded color selection.

12. The device according to claim 10, wherein the one or more operating elements are configured as sliders, for setting each color of the at least two color zones.

13. The device according to claim 10, wherein the display device and operating device are configured to determine a quantity of the colors that can be selected for at least one more of the at least two color zones, depending on the selected color for a first of the at least two color zones.

14. The device according to claim 13, wherein colors of the specified quantity are displayed for selection by the user on the display and operating device.

15. The device according to claim 13, wherein the display device and operating device are configured to configure selectable colors in the form of a color wheel, and/or configure colors of the determined quantity in the form of a color circle.

16. The device according to claim 13, wherein the display device and operating device are configured to determine the quantity on the basis of a list stored in a memory device, the list comprising assignments of selected colors to quantities of colors.

17. The device according to claim 13, wherein the display device and operating device are configured to determine the quantity on the basis of the selected color such that the quantity comprises colors that belong to a same color family, wherein the color family comprises colors adjacent to the selected color on a color wheel or within a predefined distance in a color space.

18. The device according to claim 13, wherein the display device and operating device are configured to determine the quantity on the basis of the selected color such that the quantity comprises colors that are in a predefined color space within a predefined distance around the selected color.

19. A method for controlling interior lighting for a vehicle, wherein a plurality of lighting units are distributed in the interior of the vehicle, the lighting units each having one of at least two color zones, the method comprising:

generating, via a display and operating device, a plurality of arrangement profiles for at least two color zones in the interior of the vehicle, wherein each arrangement profile defines a respective assignment of the at least two color zones to multiple predefined lighting zones in the interior of the vehicle, wherein different ones of the arrangement profiles define different respective assignments of the at least two color zones to the multiple predefined lighting zones, wherein the arrangement profiles are displayed via virtual operating elements comprising interactive graphical representations of the respective assignments;

recording a user selection of one of the arrangement profiles via the virtual operating elements;

recording a color selection for each of the at least two color zones via one or more virtual operating elements displayed on the display and operating device;

determining a quantity of the colors that can be selected for at least one more of the at least two color zones, depending on the selected color for a first of the at least two color zones; and setting, via a control device, a color for each lighting unit according to the selected arrangement profile and the colors selected for the at least two color zones.

20. The method according to claim 19, further comprising adapting a graphic representation of the arrangement profiles on the display and operating device, based on a recorded color selection.

* * * * *